US012681348B2

(12) United States Patent
Kim et al.

(10) Patent No.: US 12,681,348 B2
(45) Date of Patent: Jul. 14, 2026

(54) DISPLAY DEVICE

(71) Applicant: LG ELECTRONICS INC., Seoul (KR)

(72) Inventors: Gihwan Kim, Seoul (KR); Changgyu Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 18/794,651

(22) Filed: Aug. 5, 2024

(65) Prior Publication Data

US 2025/0053045 A1    Feb. 13, 2025

(30) Foreign Application Priority Data

Aug. 7, 2023    (KR) ......................... 10-2023-0102730

(51) Int. Cl.
*G02F 1/13357*    (2006.01)
*G06F 1/16*    (2006.01)

(52) U.S. Cl.
CPC ...... *G02F 1/133608* (2013.01); *G06F 1/1607* (2013.01)

(58) Field of Classification Search
CPC ............. F16M 13/02; F16M 2200/024; F16M 2200/02; F16M 2200/08; G02F 1/13357; F06F 1/16
See application file for complete search history.

(56) References Cited

U.S. PATENT DOCUMENTS

| | | | | |
|---|---|---|---|---|
| 7,267,315 | B2 | 9/2007 | Chen | |
| 7,331,551 | B2 * | 2/2008 | Oddsen, Jr. ............ | F16M 11/24 361/679.55 |
| 2012/0257335 | A1 | 10/2012 | Iwai et al. | |

FOREIGN PATENT DOCUMENTS

| | | |
|---|---|---|
| CN | 219453381 | 8/2023 |
| EP | 3407597 | 11/2018 |
| KR | 100545230 | 1/2006 |
| KR | 1020130122356 | 11/2013 |
| WO | 2023128227 | 7/2023 |

OTHER PUBLICATIONS

European Patent Office Application Serial No. 24191147.8, Search Report dated Jan. 7, 2025, 7 pages.
Korean Intellectual Property Office Application No. 10-2023-0102730, Notice of Allowance dated Feb. 20, 2025, 2 pages.

* cited by examiner

*Primary Examiner* — William J Carter
(74) *Attorney, Agent, or Firm* — LEE, HONG, DEGERMAN, KANG & WAIMEY

(57) ABSTRACT

Disclosed is a display device. The display device includes: a display panel; a frame to which the display panel is coupled, and is located in a rear of the display panel; a fixer which is coupled to the frame, and protrudes toward a rear of the frame; and a stand which is coupled to the fixer, wherein the stand includes: a stand body in which a plurality of fastening holes that are sequentially arranged in an up-down direction are formed; a fixer holder which is inserted into at least one of the plurality of fastening holes; and a stand leg coupled to a bottom of the stand body, wherein the fixer is inserted into the fixer holder.

7 Claims, 17 Drawing Sheets

83

DISPLAY DEVICE

CROSS-REFERENCE TO RELATED APPLICATION(S)

Pursuant to 35 U.S.C. § 119, this application claims the benefit of earlier filing date and right of priority to Korean Application No(s). 10-2023-0102730 filed on Aug. 7, 2023, the contents of which are all incorporated by reference herein in its entirety.

TECHNICAL FIELD

This disclosure relates to a display device.

BACKGROUND

As the information society develops, the demand for display devices is also increasing in various forms. In response to this, in recent years, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used.

The display device may include a panel and various sheets for displaying images, and may include structures such as various guides, frames, and covers to arrange, support, couple, and protect the components of the display device. The display device may further include a stand to support a display panel and position the display panel upward from a floor.

When moving a display device, it is necessary to separate or reassemble the stand and components of the display device, and also necessary to adjust the height of the display panel according to user's needs. Recently, much research has been conducted to solve these problems.

SUMMARY

The disclosure has been made in view of the above problems, and may provide a display device that can easily couple or separate a stand.

The disclosure may further provide a display device that can stably couple a stand.

The disclosure may further provide a display device that can be coupled with a stand without fastening a screw.

The disclosure may further provide a display device that can conveniently adjust a height.

In accordance with an aspect of the present disclosure, a display device includes: a display panel; a frame to which the display panel is coupled, and is located in a rear of the display panel; a fixer which is coupled to the frame, and protrudes toward a rear of the frame; and a stand which is coupled to the fixer, wherein the stand includes: a stand body in which a plurality of fastening holes that are sequentially arranged in an up-down direction are formed; a fixer holder which is inserted into at least one of the plurality of fastening holes; and a stand leg coupled to a bottom of the stand body, wherein the fixer is inserted into the fixer holder.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
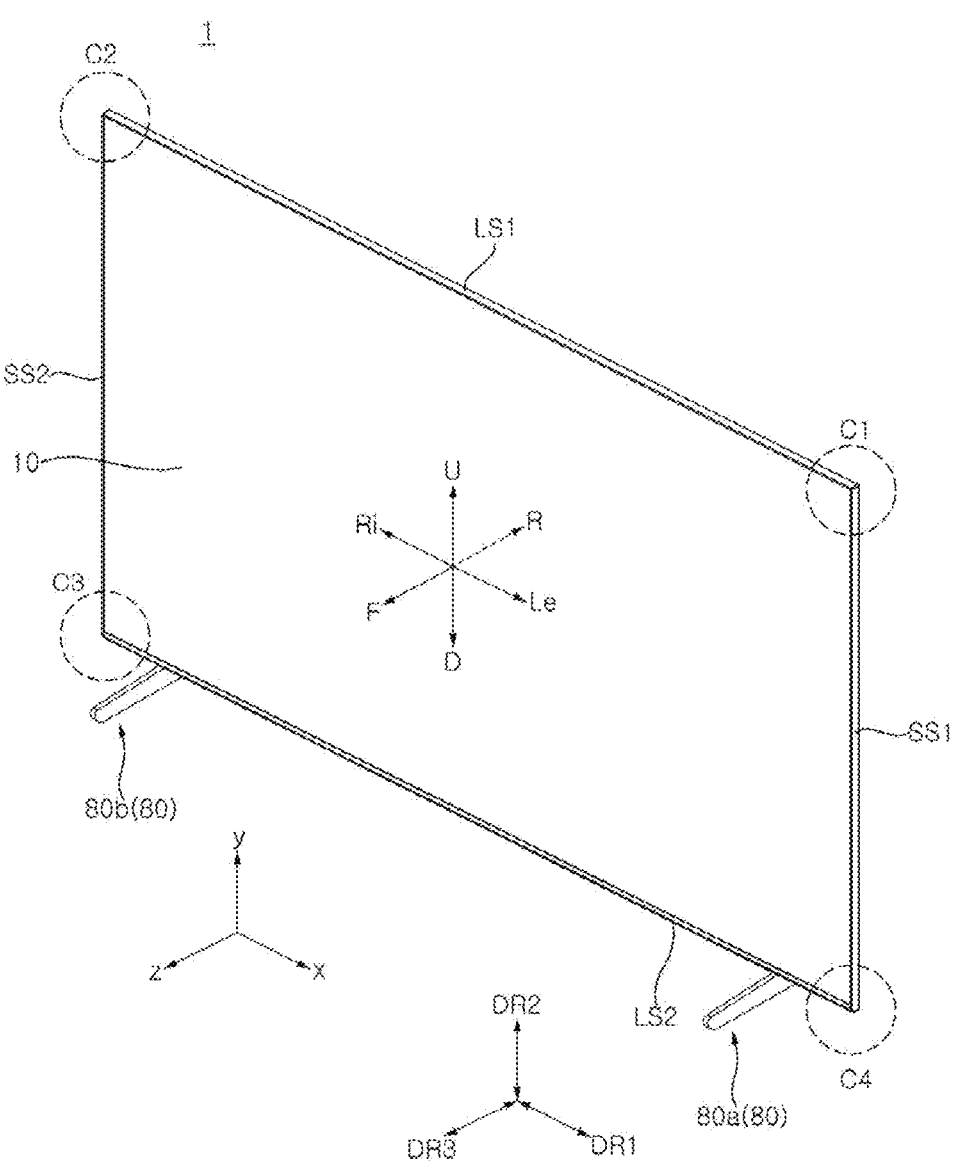
FIGS. 1 to 17 are diagrams showing examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

The direction indications of up (U), down (D), left (Le), right (Ri), front (F), and rear (R) shown in the drawings are only for convenience of explanation, and the technical idea disclosed in this specification is not limited.

Referring to FIG. 1, a display device 1 may include a display panel 10. The display panel 10 may display a screen.

The display device 1 may include a first long side LS1, a second long side LS2 facing the first long side LS1, a first short side SS1 adjacent to the first long side LS1 and the second long side LS2, and a second short side SS2 facing the first short side SS1.

For convenience of explanation, it is illustrated that the lengths of the first and second long sides LS1 and LS2 are longer than the lengths of the first and second short sides SS1 and SS2, but it may be possible that the lengths of the first and second long sides LS1 and LS2 are approximately the same as the lengths of the first and second short sides SS1 and SS2.

The direction parallel to the long side LS1, LS2 of the display device 1 may be referred to as a left-right direction or a first direction DR1. The direction parallel to the short side SS1, SS2 of the display device 1 may be referred to as an up-down direction or a second direction DR2. The direction perpendicular to the long side LS1, LS2 and the short side SS1, SS2 of the display device 1 may be referred to as a front-rear direction or a third direction DR3.

The direction in which the display panel 10 displays images may be referred to as a forward direction (F, z), and the opposite direction may be referred to as a rearward direction R. The side of first long side LS1 may be referred to as an upper side (U, y). The side of second long side LS2 may be referred to as a lower side (D, −y). The side of first short side SS1 may be referred to as a left side (Le, x). The side of second short side SS2 may be referred to as a right side (Ri, −x).

The first long side LS1, the second long side LS2, the first short side SS1, and the second short side SS2 may be referred to as an edge of the display device 1. In addition, a point where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Figure 2:
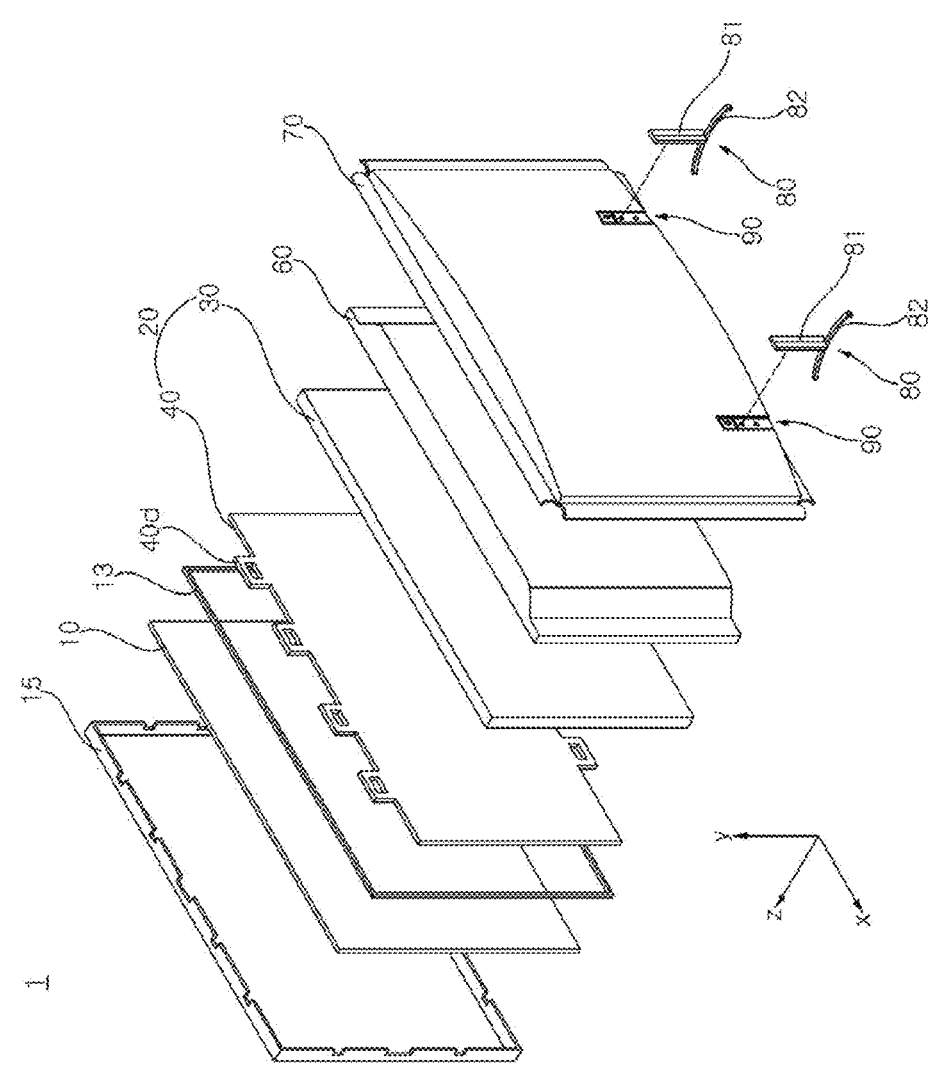
Figure 3:
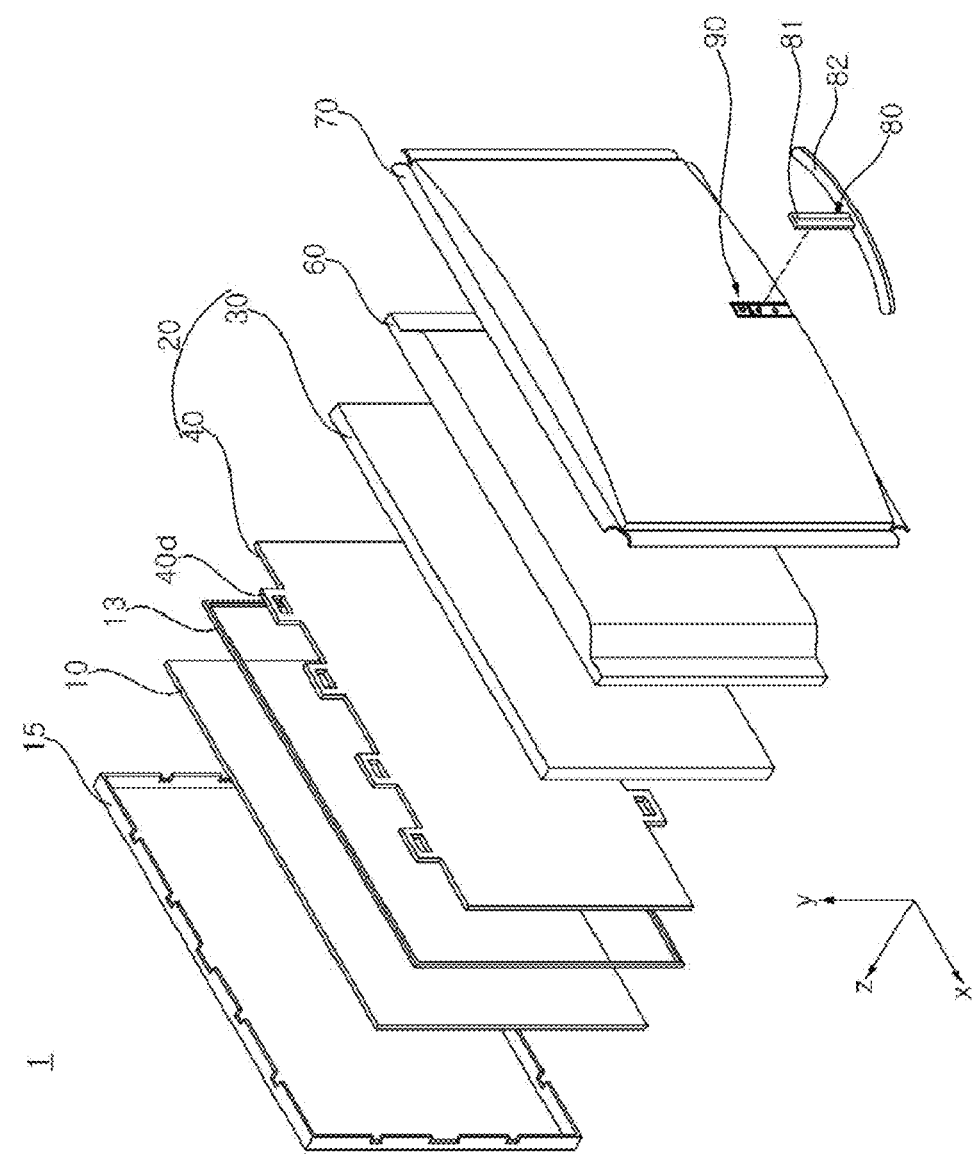

Referring to FIGS. 2 and 3, the display device 1 may include a display panel 10, a front cover 15, a guide panel 13, a backlight unit 20, a frame 60, and a back cover 70.

The display panel 10 may form the front surface of the display device 1, and may display images. The display panel 10 may display an image by outputting red, green, or blue (RGB) for each pixel according to a timing by a plurality of pixels. The display panel 10 may be divided into an active area in which an image is displayed and a de-active area in which an image is not displayed. The display panel 10 may include a front substrate and a rear substrate that are opposite to each other with a liquid crystal layer interposed therebetween. The display panel 10 may be referred to as an LCD panel. The display panel 10 is explained as an LCD panel, but an OLED panel may also be applied.

The front substrate may include a plurality of pixels including red R, green G, and blue B sub-pixels. The front substrate may output light corresponding to red, green, or blue color according to a control signal.

The rear substrate may include switching elements. The rear substrate may switch a pixel electrode. For example, the pixel electrode may change the molecular arrangement of liquid crystal layer according to a control signal applied from the outside. The liquid crystal layer may include liquid crystal molecules. The arrangement of the liquid crystal molecules may change according to a voltage difference generated between the pixel electrode and the common electrode. The liquid crystal layer may transmit light provided from the backlight unit 20 to the front substrate or block the light.

The front cover 15 may surround the circumference of the display panel 10, and cover at least partial area of the front and side surfaces of the display panel 10. The front cover 15 may extend along the circumference of the display panel 10. The front cover 15 may be divided into a first part located on the front surface of the display panel 10 and a second part located on the side surface. The first part and the second part may be provided separately, or may be provided as one body. At least one of the first part and the second part may be omitted. The front cover 15 may be referred to as a case top.

The guide panel 13 may surround the circumference of the display panel 10, and cover at least partial area of the rear and side surfaces of the display panel 10. The guide panel 13 may be coupled to the display panel 10, or may support the display panel 10. The guide panel 13 may be referred to as a panel guide or side frame.

The backlight unit 20 may be located in a rearward direction of the display panel 10. The backlight unit 20 may include light sources. The backlight unit 20 may be coupled to a frame 60 in a forward direction of the frame 60. The backlight unit 20 may be driven by a full driving method or a partial driving method such as local dimming or impulsive. The backlight unit 20 may include an optical sheet 40 and an optical layer 30. When the display panel 10 is an OLED panel, the backlight unit 20 may be omitted.

The optical sheet 40 may evenly transmit light from a light source to the display panel 10. The optical sheet 40 may include a plurality of layers. For example, the optical sheet 40 may include a prism sheet or a diffusion sheet. For example, the optical sheet 40 may be a double brightness enhancement film (DBEF). Meanwhile, a coupling portion 40d of the optical sheet 40 may be coupled to the front cover 15, the frame 60, or the back cover 70.

The frame 60 may be located in a rear of the backlight unit 20 and may support the components of the display device 1. For example, the components such as the backlight unit 20, a Printed Circuit Board (PCB) on which a plurality of electronic devices are located may be coupled to the frame 60. The frame 60 may include a metal material such as aluminum alloy. The frame 60 may be referred to as a main frame or module cover.

The back cover 70 may cover the rear of the frame 60. The back cover 70 may be coupled to the frame 60 and/or front cover 15. For example, the back cover 70 may be an injection molded product made of resin. For another example, the back cover 70 may include a metal material.

Meanwhile, a cable (not shown) may be electrically connected to the display panel 10 and a source PCB (not shown). The source PCB may be located in the rear of the frame 60.

Meanwhile, the display device 1 may further include a stand 80. The stand 80 may be located in the rear of the back cover 70. The stand 80 may be coupled to the rear of the frame 60. The stand 80 may be coupled to a mounting portion 90 formed in the rear of the back cover 70. The mounting portion 90 may be formed in a location adjacent to the lower portion of the rear surface of the back cover 70. The stand 80 may be detachably coupled to the frame 60 and/or the back cover 70.

The stand 80 extends upward from the floor to stand up, and may support the frame 60 so that the frame 60 can be erected from the floor. The stand 80 may include a stand body 81 and a stand leg 82. The stand leg 82 may be in contact with the floor and support the stand body 81 so that the stand body 81 can be erected. The stand body 81 may extend upward from the stand leg 82.

Referring to FIG. 2, a plurality of stands 80 may be provided. For example, a pair of stands 80 may be located adjacent to both sides of the back cover 70 based on the left-right direction. Referring to FIG. 3, the stand 80 may be provided as a single stand. The single stand 80 may be located in the center of the back cover 70 based on the left-right direction.

Figure 4:
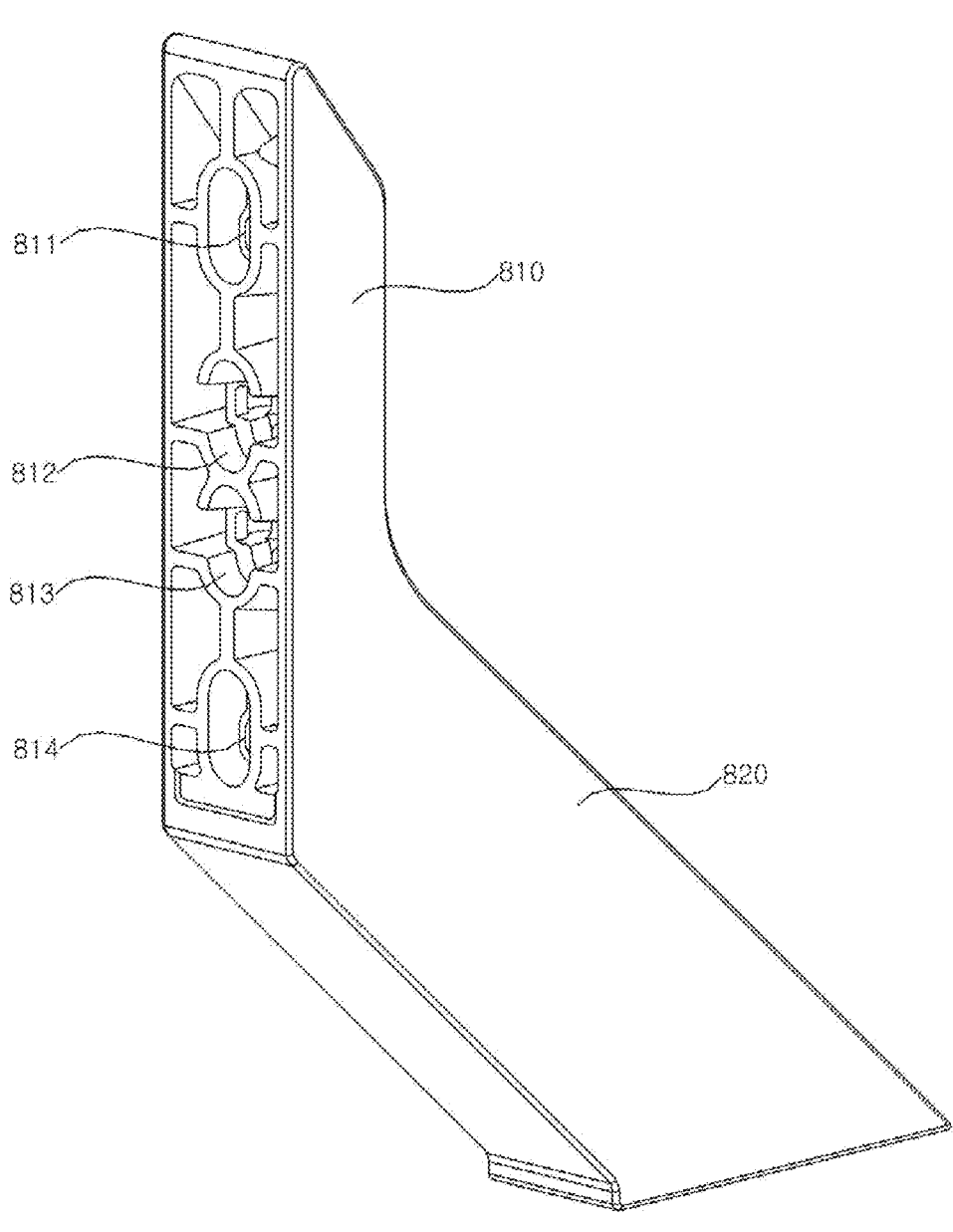
Figure 5:
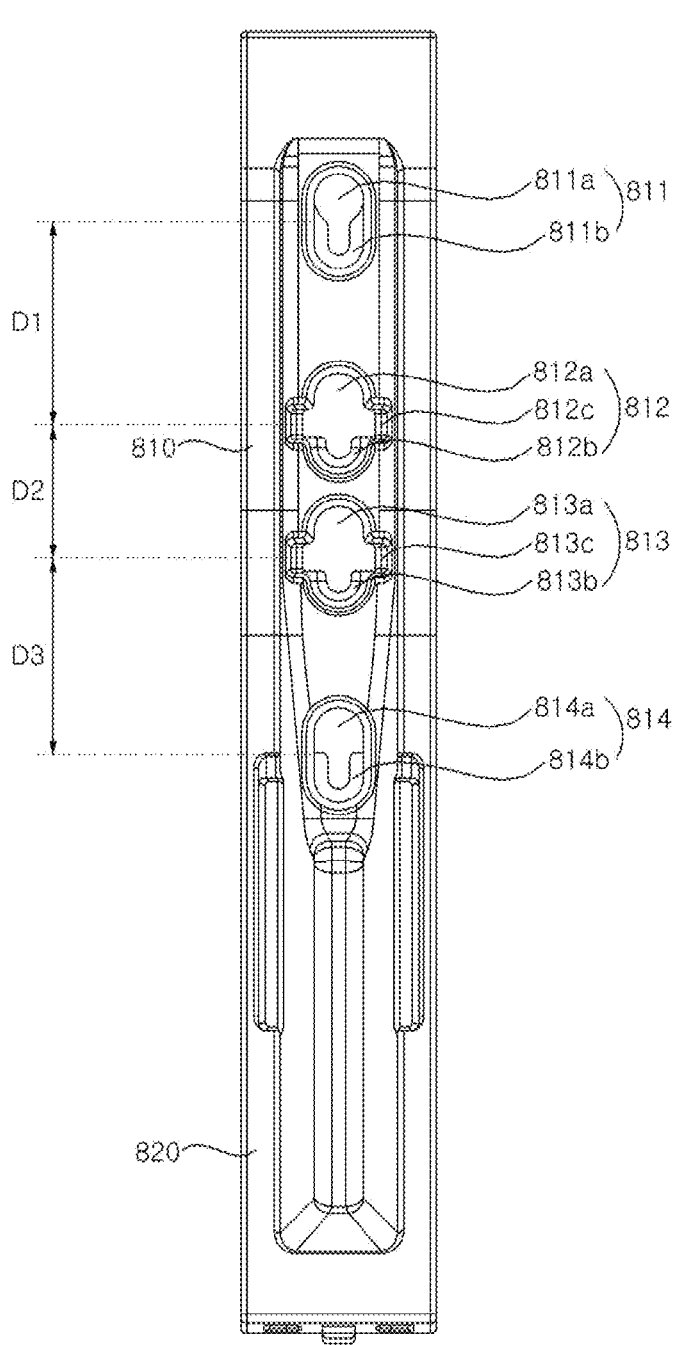

Referring to FIGS. 4 and 5, the stand body 81 may include a vertical body 810 and an inclined body 820. The vertical body 810 may extend in the up-down direction. The inclined body 820 may extend while forming an inclination with respect to the vertical body 810.

The vertical body 810 may include a fastening hole 811, 812, 813, 814. The fastening hole 811, 812, 813, 814 may be formed to penetrate the vertical body 810. A plurality of fastening holes 811, 812, 813, and 814 may be arranged to be spaced apart from each other in the longitudinal direction of the vertical body 810. For example, there may be four fastening holes 811, 812, 813, and 814. The four fastening holes 811, 812, 813, 814 may form two pairs.

A first fastening hole 811 may be located in the uppermost side of the vertical body 810 among the fastening holes 811, 812, 813, and 814. The first fastening hole 811 may include an insertion hole 811a and a hooking portion 811b. For example, the insertion hole 811a may have an oval shape. The hooking portion 811b may be formed in a portion of the insertion hole 811a, and may be a rib extending to the inside of the insertion hole 811a. For example, the hooking portion 811b has an overall U shape, and may fill a portion of the lower side of the insertion hole 811a. Accordingly, a circle hole may be formed in the upper side of the insertion hole 811a, and a slit may be formed in the lower side of the insertion hole 811a. The slit may be connected to a circle hole.

A second fastening hole 812 may be located in the upper side of the vertical body 810 among the fastening holes 811, 812, 813, and 814, and adjacent to the lower side of the first fastening hole 811. The second fastening hole 812 may include an insertion hole 812a, a hooking portion 812b, and a fastening portion 812c. For example, the insertion hole 812a may have an oval shape. The hooking portion 812b may be formed in a portion of the insertion hole 812a, and may be a rib extending to the inside of the insertion hole 812a. For example, the hooking portion 812b has an overall U shape, and may fill a portion of the lower side of the insertion hole 812a. Accordingly, a circle hole may be formed in the upper side of the insertion hole 812a, and a slit may be formed in the lower side of the insertion hole 812a. The slit may be connected to a circle hole. The fastening portion 812c may be located between the circle hole and the slit in the center of the insertion hole 812a, and may be formed by removing both sides of the inner wall of the insertion hole 812a. The opening of the insertion hole 812a may be expanded by the fastening portion 812c.

A third fastening hole 813 may be located in the lower side of the vertical body 810 among the fastening holes 811, 812, 813, and 814, and may be adjacent to the lower side of the second fastening hole 812. The third fastening hole 813 may include an insertion hole 813a, a hooking portion 813b, and a fastening portion 813c. For example, the insertion hole 813a may have an oval shape. The hooking portion 813b may be a rib that is formed in a portion of the insertion hole 813a and extends to the inside of the insertion hole 813a. For example, the hooking portion 813b may have an overall U shape, and may fill a portion of the lower side of the insertion hole 813a. Accordingly, a circle hole may be formed in the upper side of the insertion hole 813a, and a slit may be formed in the lower side of the insertion hole 813a. The slit may be connected to a circle hole. The fastening portion 813c may be located between the circle hole and the slit in the center of the insertion hole 813a, and may be formed by removing both sides of the inner wall of the insertion hole 813a. The opening of the insertion hole 813a may be expanded by the fastening portion 813c.

A fourth fastening hole 814 may be located in the lowermost side of the vertical body 810 among the fastening holes 811, 812, 813, and 814. The fourth fastening hole 814 may include an insertion hole 814a and a hooking portion 814b. For example, the insertion hole 814a may have an oval shape. The hooking portion 814b may be a rib that is formed in a portion of the insertion hole 814a, and extends to the inside of the insertion hole 814a. For example, the hooking portion 814b may have an overall U shape, and may fill a portion of the lower side of the insertion hole 814a. Accordingly, a circle hole may be formed in the upper side of the insertion hole 814a, and a slit may be formed in the lower side of the insertion hole 814a. The slit may be connected to a circle hole.

A first distance D1 between the first fastening hole 811 and the second fastening hole 812 may be longer than a second distance D2 between the second fastening hole 812 and the third fastening hole 813. The second distance D2 may be shorter than a third distance D3 between the third fastening hole 813 and the fourth fastening hole 814. The first distance D1 may be equal to the third distance D3.

Figure 6:
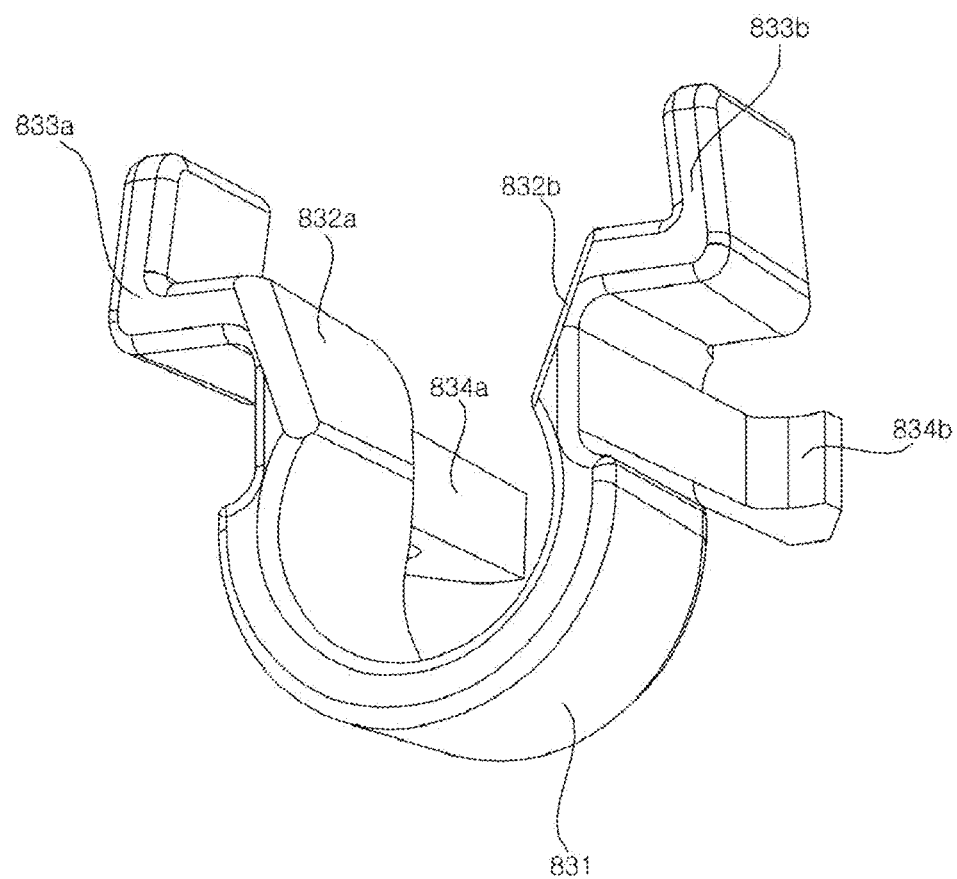
Figure 7:
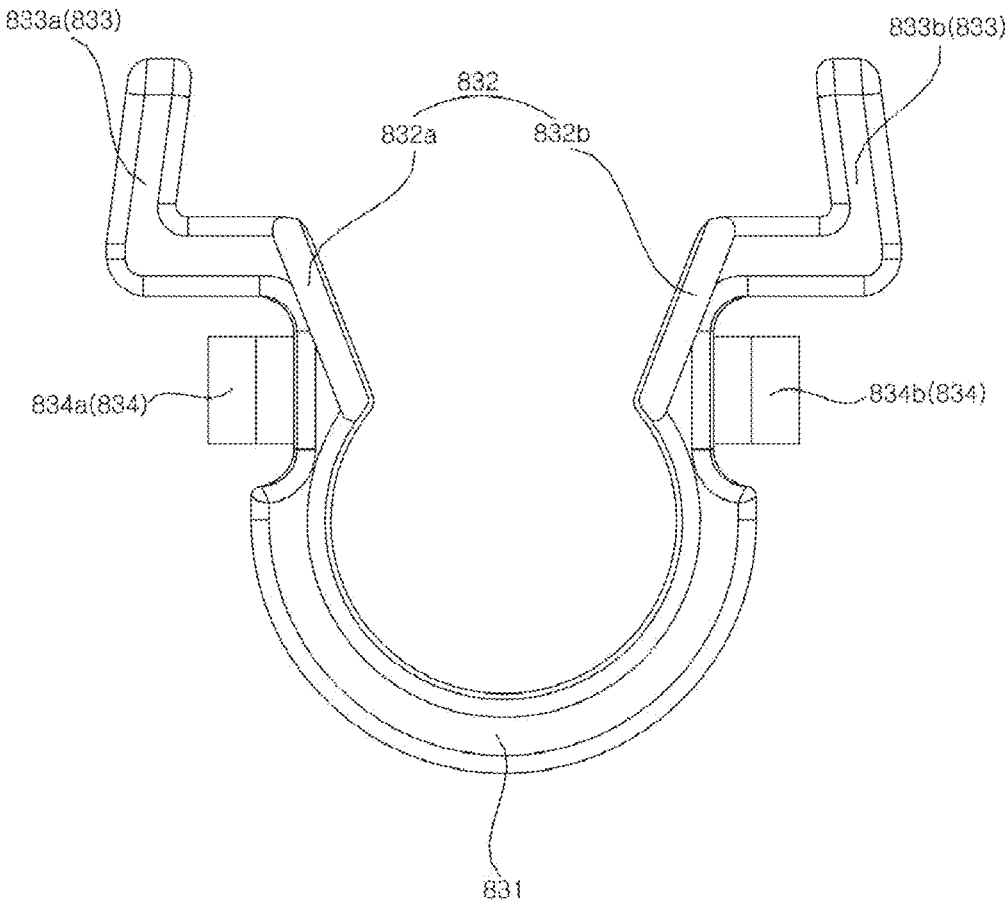

Referring to FIGS. 6 and 7, a fixer holder 83 may include a holder body 831, a guide stopper 832, a hook 834, and an end tip 833. The holder body 831 may be an open circle or half circle having open one side. The fixer holder 83 may have elasticity as a whole.

The guide stopper 832 may extend from both ends of the holder body 831. The guide stoppers 832 may be paired and face each other. The guide stopper 832 may extend from one end of the holder body 831 in the radial direction of the half circle. A pair of guide stoppers 832 may extend away from each other in the radial direction of the holder body 831.

The end tips 833 may be a pair. Each of the pair of end tips 833 may be connected to each of the pair of guide stoppers 832. The end tip 833 may have a curved shape. The holder body 831, the guide stopper 832, and the end tip 833 may have an overall omega shape.

The hook 834 may extend from the guide stopper 832 and/or the holder body 831 in a direction parallel to the direction of central axis of the half circle of the holder body 831. The hooks 834 may be a pair, and each of the pair of hooks 834 may extend from each of the pair of guide stoppers 832 and/or the holder body 831.

Figure 8:
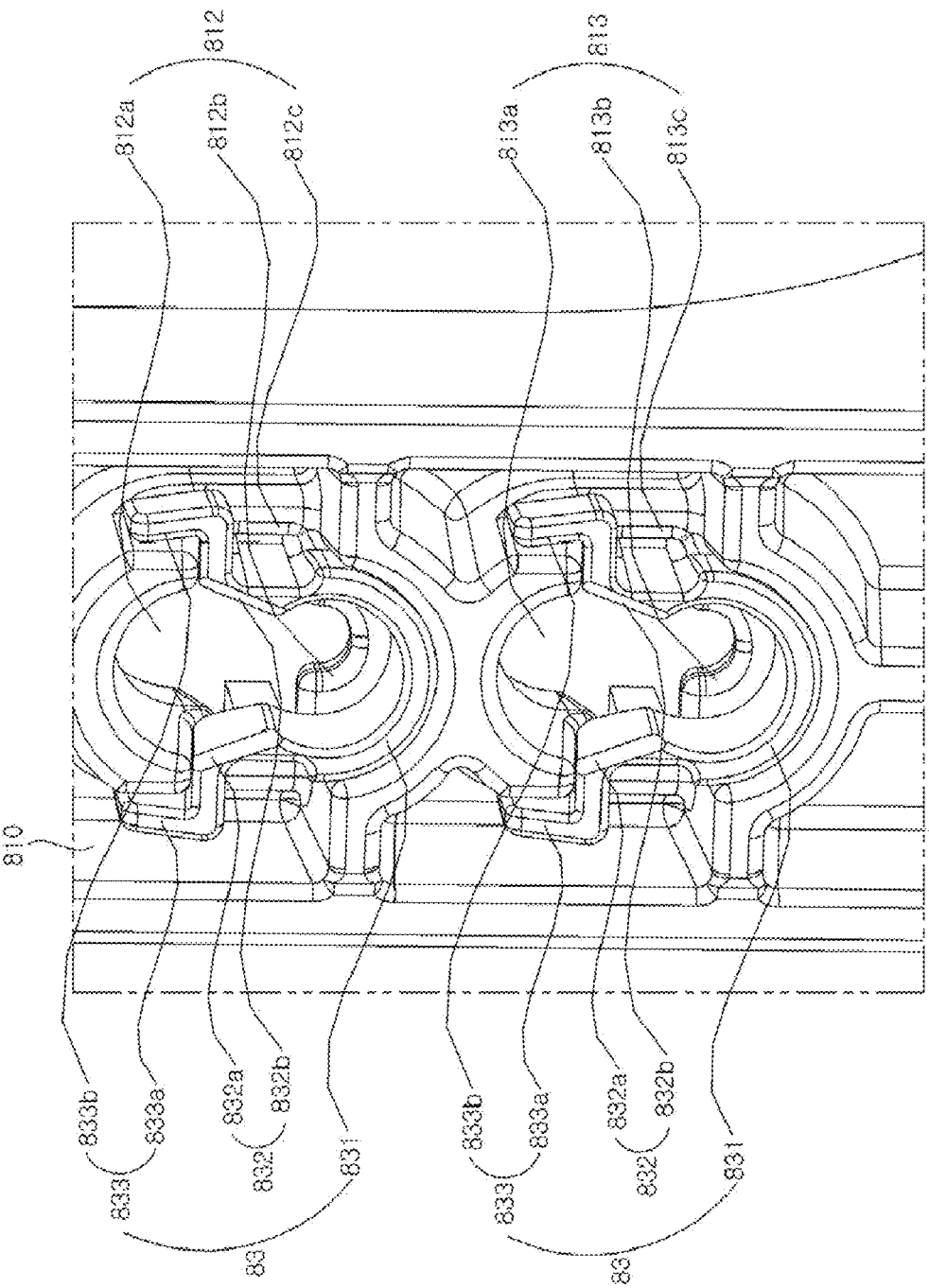
Figure 9:
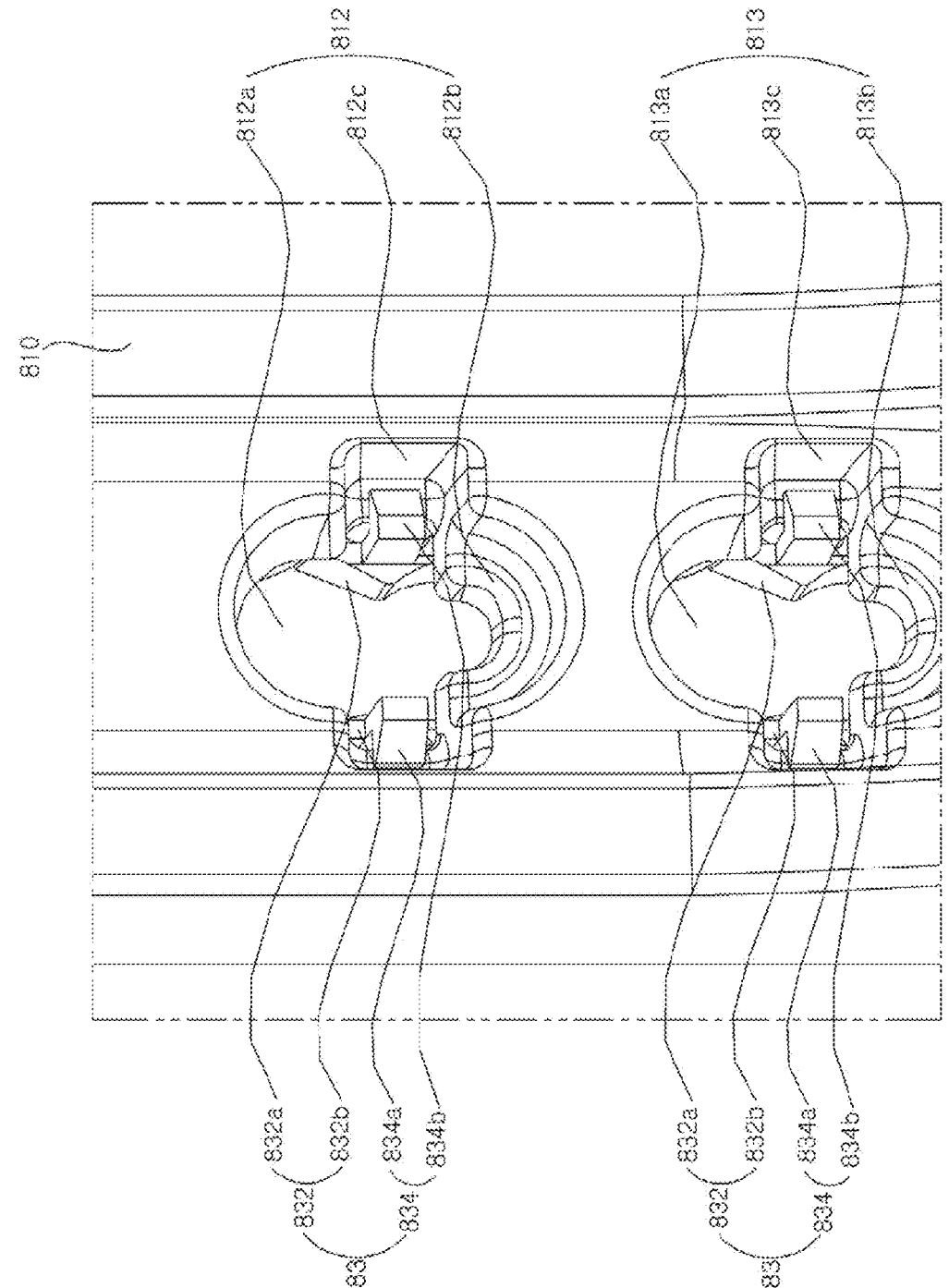
Figure 10:
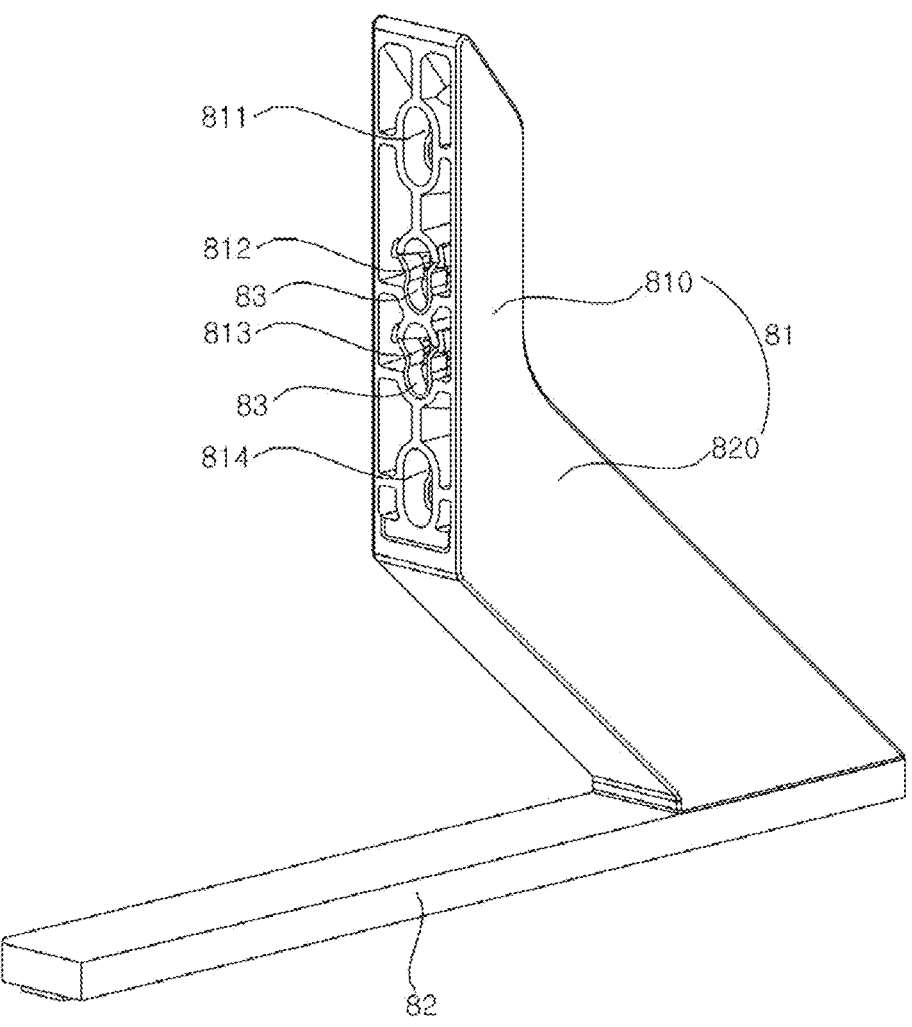
Figure 11:
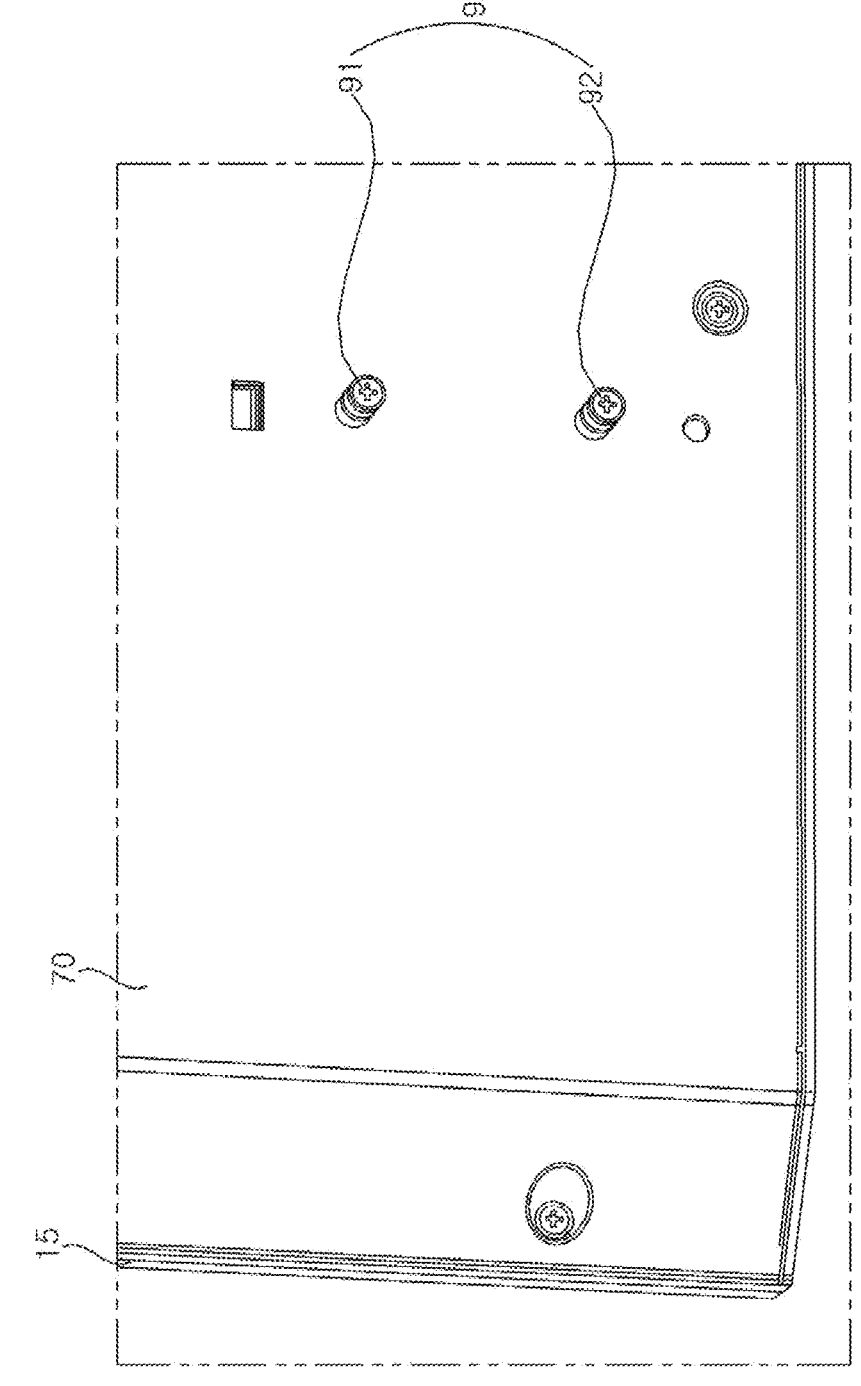
Figure 12:
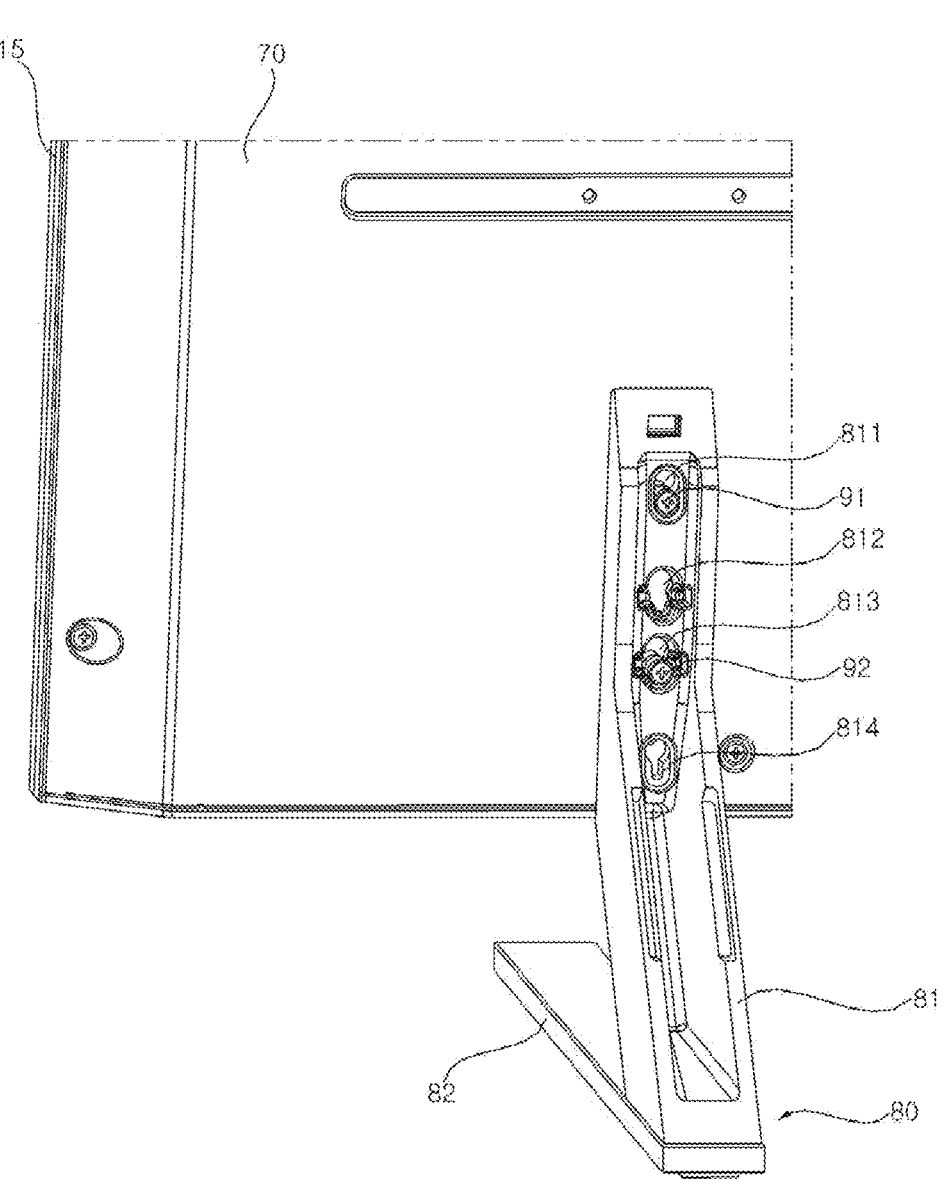
Figure 13:
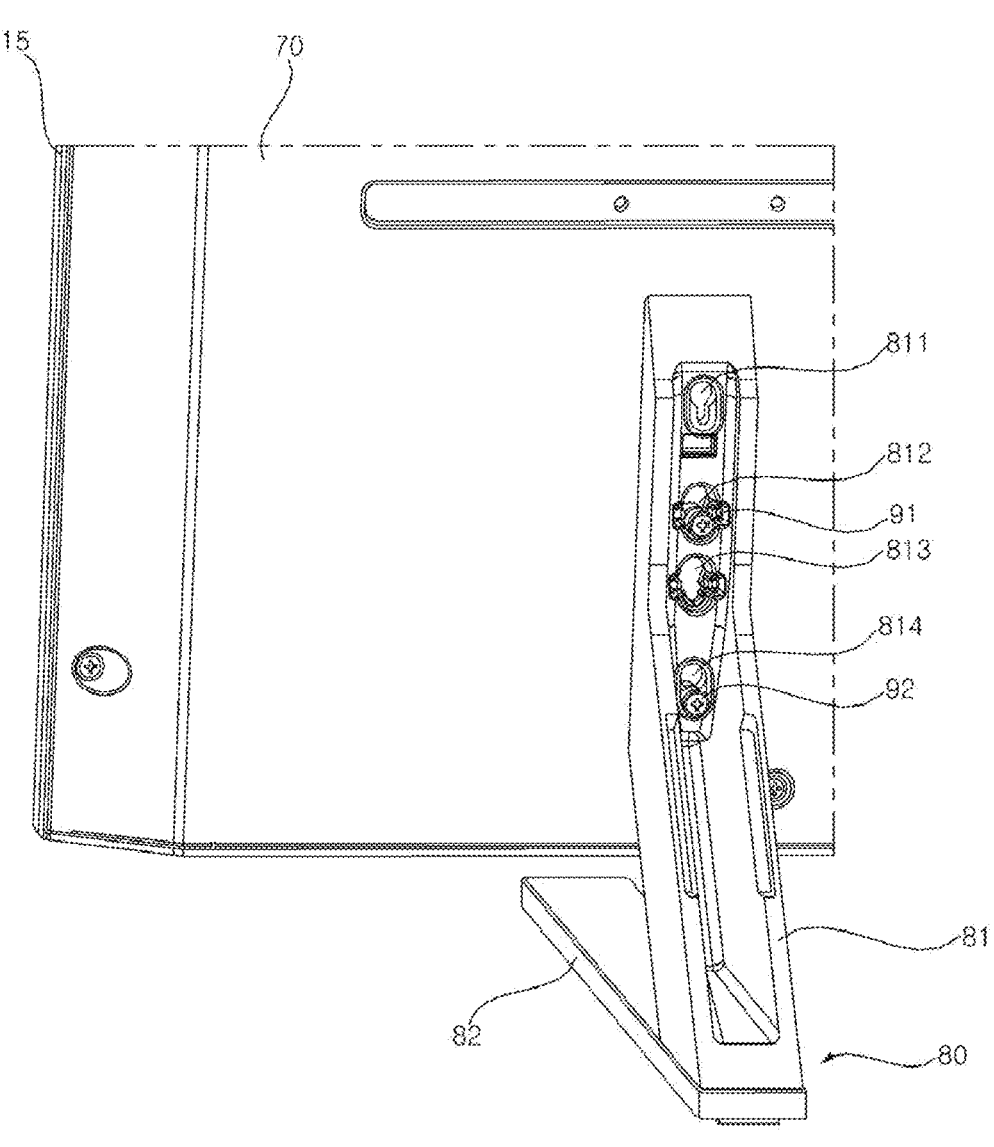

Referring to FIGS. 8 and 9, the fixer holder 83 may be inserted into the second fastening hole 812 and/or the third fastening hole 813. The holder body 831 may be inserted into the lower side of the insertion hole 812a, 813a of the fastening hole 812, 813, and may be supported by the hooking portion 812b, 813b.

The outer diameter of the holder body 831 may correspond to the diameter of the inner wall of the lower side of the insertion hole 812a, 813a. The inner wall of the lower side of the insertion hole 812a, 813a may be supported by or in contact with the outer wall of the holder body 831.

The hook 834 may be hooked to the fastening portion 812c, 813c of the fastening hole 812, 813 to fix the fixer holder 83 to the fastening hole 812, 813. The end tip 833 may be supported by the outer wall of the circle hole of the upper side of the insertion hole 812a, 813a. The end tip 833 may restrict the diameter of the holder body 831 from being reduced.

Referring to FIGS. 10 to 13, the mounting portion 90 may include a fixer 91, 92. There may be a plurality of fixers 91 and 92. A plurality of fixers 91 and 92 may be arranged in the up-down direction. A first fixer 91 may be fixed to the frame 60 (see FIGS. 2 and 3) and/or the back cover 70, and may protrude from the rear surface of the back cover 70. A second fixer 92 may be adjacent to the first fixer 91 in the lower side of the first fixer 91. The second fixer 92 may be fixed to the frame 60 and/or the back cover 70, and may protrude from the rear surface of the back cover 70.

The distance between the first fixer 91 and the second fixer 92 may correspond to the distance between the first fastening hole 811 and the third fastening hole 813 or the distance between the second fastening hole 812 and the fourth fastening hole 814. When the first fixer 91 is inserted into the first fastening hole 811, the second fixer 92 may be inserted into the third fastening hole 813. When the first fixer 91 is inserted into the second fastening hole 812, the second fixer 92 may be inserted into the fourth fastening hole 814.

Figure 14:
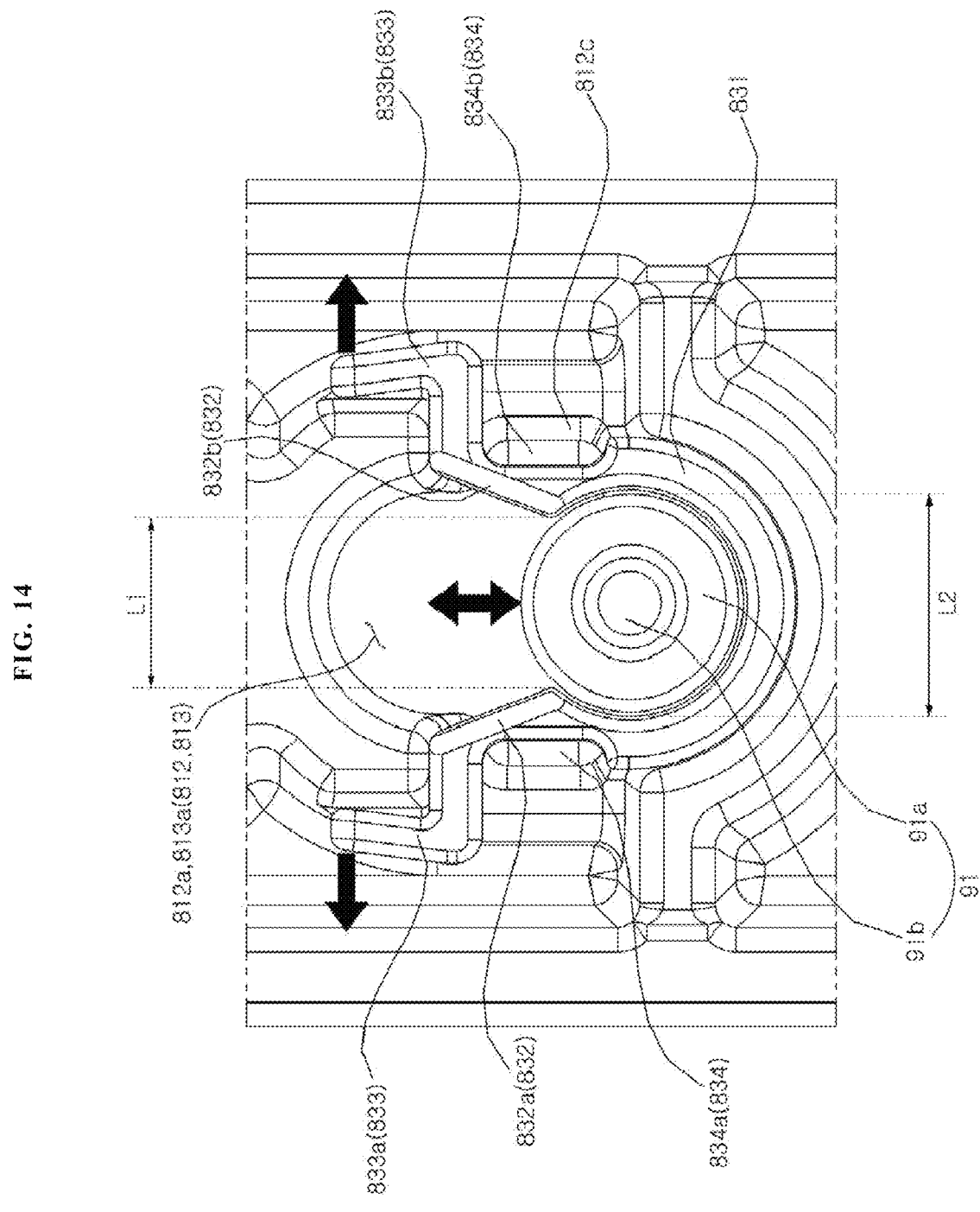

Referring to FIG. 14, the fixer 91 may include a fixed shaft 91b and a head 91a. The head 91a may be formed in the upper end of the fixed shaft 91b. The head 91a may have a disk shape. The diameter of the head 91a may be larger than the diameter of the fixed shaft 91b.

The head 91a of the fixer 91 may be inserted into the fastening hole 812, 813 through a circle hole of the insertion hole 812a, 813a. After the head 91a is inserted, the fixer 91 may move to the slit of the insertion hole 812a, 813a. As the fixer 91 moves, the lower side of the head 91a of the fixer 91 may be supported by the hooking portion 812b, 813b (see FIG. 9) of the fastening hole 812, 813. As the fixer 91 moves, the head 91a of the fixer 91 may rub along the guide stopper 832 of the fixer holder 831. As the head 91a of the fixer 91 is inserted into the holder body 831, a gap of the guide stopper 832 may widen or narrow. The position of the fixer 91 may be fixed by the holder body 831 and the guide stopper 832 of the fixer holder 83.

When the fixer 91 comes out of the holder body 831 of the fixer holder 83, the gap of the guide stopper 832 may widen. The force with which the fixer holder 83 tightens the fixer 91 may correspond to the weight of the stand 80. A user may insert the stand 80 into the fixer 91 or remove the stand 80 from the fixer 91. In addition, a user may easily adjust the height of the display device by adjusting the position where the stand 80 is inserted into the fixer 91.

Figure 15:
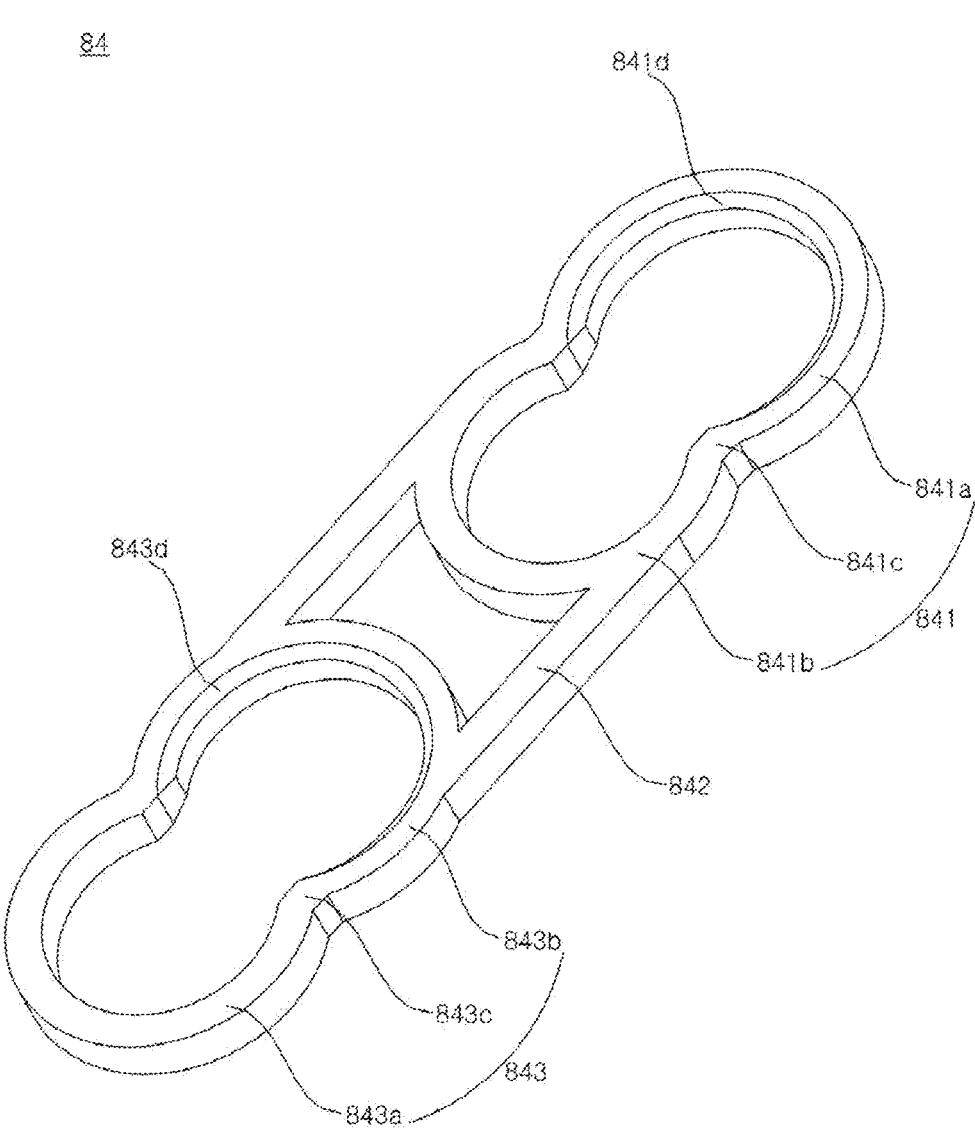

Referring to FIG. 15, the fixer holder 84 may include a first coupling 841, a second coupling 843, and a bridge 842. The fixer holder 84 may have elasticity as a whole. The first coupling 841 may include a first circle 841a and a second circle 841b. The first circle 841a may be an open circle having an open portion or a half circle. The second circle 841b may be an open circle having an open portion or a half circle, and may be connected to the first circle 841a. A narrow neck 841c may be formed between the first circle 841a and the second circle 841b. A tapered rounding part 841d may be formed in the inner edge of the first circle 841a.

The second coupling 843 may include a first circle 843a and a second circle 843b. The first circle 843a may be an open circle having an open portion or a half circle. The second circle 843b may be an open circle having an open portion or a half circle, and may be connected to the first circle 843a. A narrow neck 843c may be formed between the first circle 843a and the second circle 843b. A tapered rounding part 843d may be formed in the inner edge of the second circle 843b.

The bridge 842 may connect the second circle 841b of the first coupling 841 and the second circle 843b of the second coupling 843. The bridge 842 may be a tangent line of the second circles 841b and 843b, and may be plural.

Figure 16:
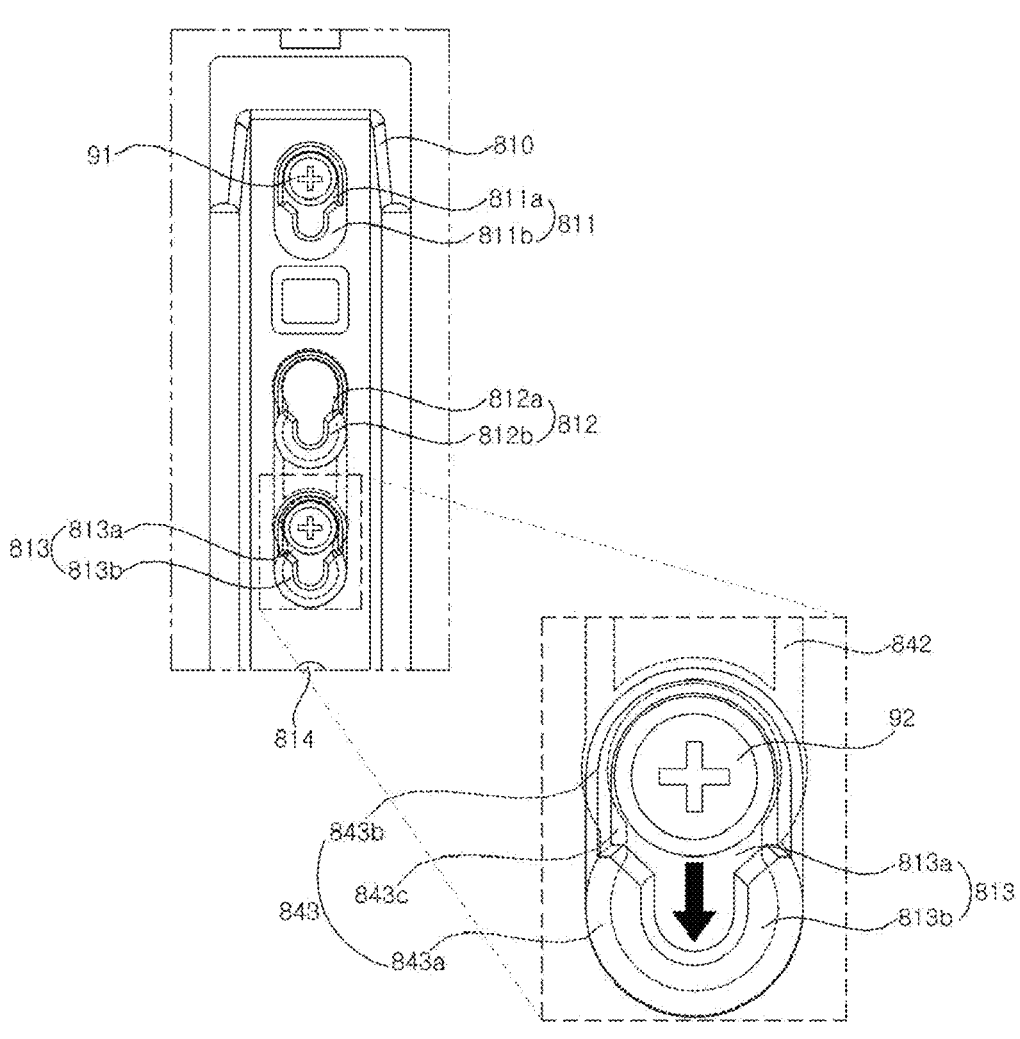
Figure 17:
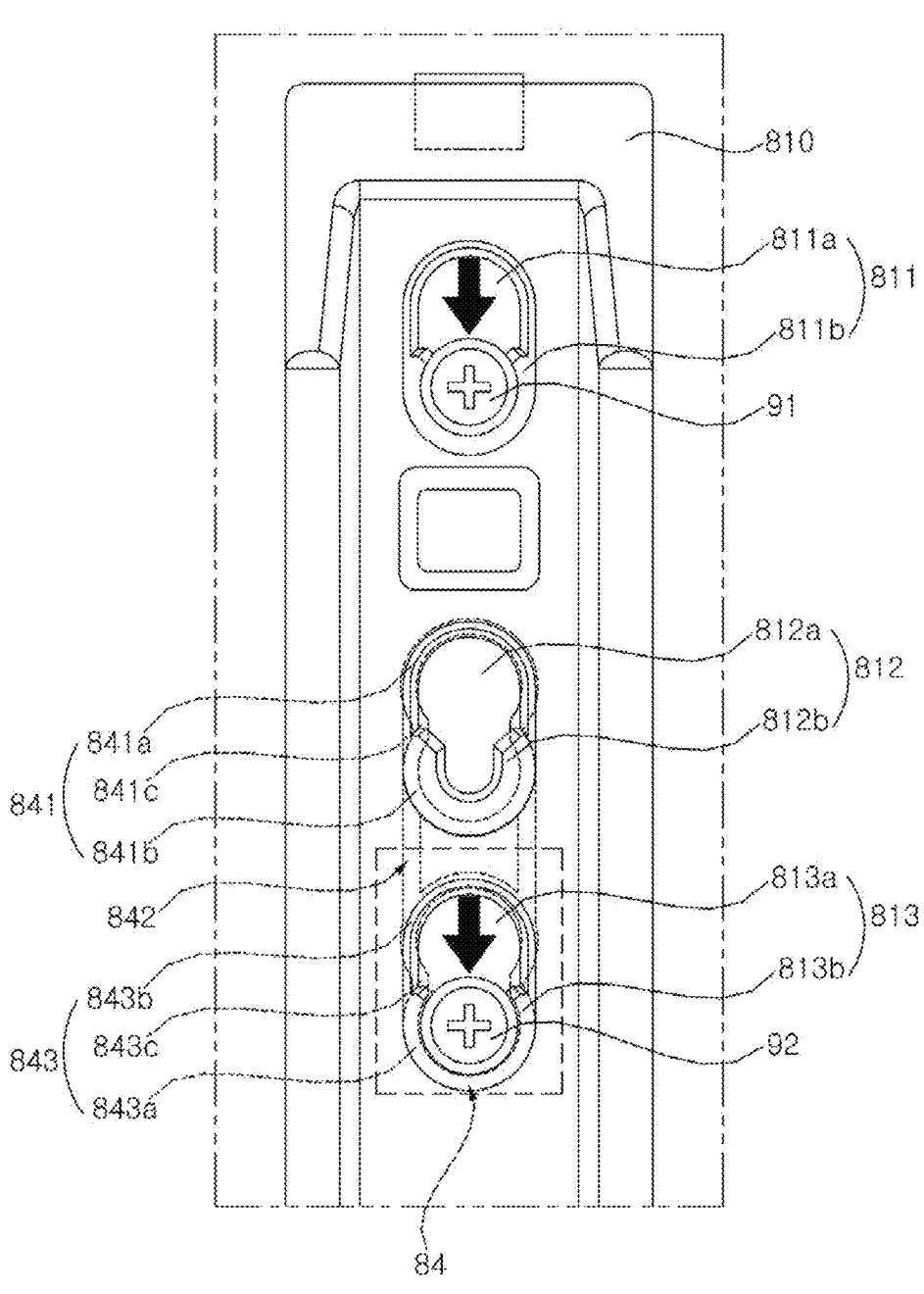

Referring to FIGS. 16 and 17, the vertical body 810 may include fastening holes 811, 812, 813, and 814. The fastening hole 811, 812, 813, 814 may be formed to penetrate the vertical body 810. A plurality of fastening holes 811, 812, 813, and 814 may be arranged to be spaced apart from each other in the longitudinal direction of the vertical body 810.

For example, there may be four fastening holes 811, 812, 813, and 814. The four fastening holes 811, 812, 813, and 814 may form two pairs.

The first fastening hole 811 may be located in the uppermost side of the vertical body 810 among the fastening holes 811, 812, 813, and 814. The first fastening hole 811 may include the insertion hole 811a and the hooking portion 811b. For example, the insertion hole 811a may have an oval shape. The hooking portion 811b may be formed in a portion of the insertion hole 811a, and may be a rib that extends to the inner side of the insertion hole 811a. For example, the hooking portion 811b has an overall U shape, and may fill a portion of the lower side of the insertion hole 811a. Accordingly, a circle hole may be formed in the upper side of the insertion hole 811a, and a slit may be formed in the lower side of the insertion hole 811a. The slit may be connected to the circle hole.

The second fastening hole 812 may be located in the upper side of the vertical body 810 among the fastening holes 811, 812, 813, and 814, and adjacent to the lower side of the first fastening hole 811. The second fastening hole 812 may include the insertion hole 812a and the hooking portion 812b. For example, the insertion hole 812a may have an oval shape. The hooking portion 812b may be formed in a portion of the insertion hole 812a, and may be a rib that extends to the inside of the insertion hole 812a. For example, the hooking portion 812b has an overall U shape, and may fill a portion of the lower side of the insertion hole 812a. Accordingly, a circle hole may be formed in the upper side of the insertion hole 812a, and a slit may be formed in the lower side of the insertion hole 812a. The slit may be connected to the circle hole.

The third fastening hole 813 may be located in the lower side of the vertical body 810 among the fastening holes 811, 812, 813, and 814, and may be adjacent to the lower side of the second fastening hole 812. The third fastening hole 813 may include the insertion hole 813a and the hooking portion 813b. For example, the insertion hole 813a may have an oval shape. The hooking portion 813b may be a rib that is formed in a portion of the insertion hole 813a and extends to the inner side of the insertion hole 813a. For example, the hooking portion 813b has an overall U shape, and may fill a portion of the lower side of the insertion hole 813a. Accordingly, a circle hole may be formed in the upper side of the insertion hole 813a, and a slit may be formed in the lower side of the insertion hole 813a. The slit may be connected to the circle hole. The description of the above-described fastening holes 811, 812, and 813 may be identically applied to the fourth fastening hole 814.

The fixer holder 84 may be coupled around the second fastening hole 812 and the third fastening hole 813. The first coupling 841 may be aligned with the second fastening hole 812, and the second coupling 843 may be aligned with the third fastening hole 813. The fixer holder 84 may be disposed around the second fastening hole 812 and the third fastening hole 813.

The first circle 841a of the first coupling 841 may be aligned with or correspond to the insertion hole 812a of the second fastening hole 812, and the second circle 843b of the second coupling 843 may be aligned with or correspond to the insertion hole 813a of the third fastening hole 813.

The first fixer 91 may be inserted into the insertion hole 811a of the first fastening hole 811, the second fixer 92 may be inserted into the insertion hole 813a of the third fastening hole 813, and the first fixer 91 and the second fixer 92 may pass through the narrow neck 841c, 843c while moving downward. When the first fixer 91 and/or the second fixer 92 are located in the hooking portion 811*b*, 813*b*, the narrow necks 841*c* and 843*c* may prevent the first fixer 91 and/or the second fixer 92 from being separated from the hooking portion 811*b*, 913*b*.

When a user moves the stand 80 (see FIGS. 12 and 13), the first fixer 91 and/or the second fixer 92 may escape from the hooking portion 811*b*, 813*b* by external force and located in the insertion holes 811*a*, 813*a*.

Referring to FIGS. 1 to 17, the display device includes: a display panel; a frame to which the display panel is coupled, and is located in a rear of the display panel; a fixer which is coupled to the frame, and protrudes toward a rear of the frame; and a stand which is coupled to the fixer, wherein the stand includes: a stand body in which a plurality of fastening holes that are sequentially arranged in an up-down direction are formed; a fixer holder which is inserted into at least one of the plurality of fastening holes; and a stand leg coupled to a bottom of the stand body, wherein the fixer is inserted into the fixer holder.

Each of the plurality of fastening holes includes: an insertion hole which is formed as a long hole extending in an up-down direction where the fastening hole is disposed; and a hooking portion which is formed in a lower side of the insertion hole, extends to an inner side of the insertion hole to form the insertion hole as a circle hole, and forms a slit connected to the circle hole.

At least one of the plurality of fastening holes further includes a fastening portion which is located between the circle hole and the slit, and expands the fastening hole in a left-right direction.

The fixer holder includes: a holder body which is supported by the hooking portion, and has an open ring shape having one side open; a pair of guide stoppers which extend from both ends of the holder body, extend toward the circle hole, and widen from the hooking portion toward the circle hole; and an end tip which extends from both ends of the pair of guide stoppers, and supported by an outer wall of the circle hole.

The fixer holder further includes a hook that extends from the guide stopper or the holder body, and is hooked to a fastening portion of the fastening hole.

The fixer includes: a fixed shaft fixed to the frame; and a head formed in a distal end of the fixed shaft, wherein a diameter of the head is larger than a diameter of the fixed shaft, and corresponds to a diameter of the circle hole.

The diameter of the head corresponds to an inner diameter of the holder body.

A width of the slit corresponds to a diameter of the fixed axis of the fixer.

In the fixer holder, the pair of guide stoppers widen when the head of the fixer moves from the circle hole to the slit, and the pair of guide stoppers are recovered when the head of the fixer is located in the slit.

A distance between a pair of narrow necks formed by the pair of guide stoppers and the holder body is smaller than the head of the fixer.

The effects of the display device according to the present disclosure will be described as follows.

According to at least one of the embodiments of the present disclosure, a display device that can easily combine or separate a stand can be provided.

According to at least one of the embodiments of the present disclosure, a display device that can stably couple a stand can be provided.

According to at least one of the embodiments of the present disclosure, a display device that can be coupled with a stand without fastening a screw may be provided.

According to at least one of the embodiments of the present disclosure, a display device that can conveniently adjust a height can be provided.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a display panel;
a frame at a rear of the display panel, the frame coupled with the display panel;
a fixer coupled to the frame and protruding along a rearward direction of the frame; and
a stand coupled to the fixer,
wherein the stand comprises:
a stand body having a plurality of fastening holes successively arranged along an up-down direction of the stand body;
a fixer holder inserted into at least one fastening hole of the plurality of fastening holes; and
a stand leg coupled to a bottom of the stand body,
wherein the fixer is inserted into the fixer holder,
wherein each of the plurality of fastening holes comprises:
an insertion hole extending along the up-down direction; and
a hooking portion at a lower side of the insertion hole, wherein the hooking portion extends to an interior of the insertion hole such that the insertion hole forms a circular hole, and the hooking portion forms a slit connected to the circular hole,
wherein the at least one fastening hole further comprises a fastening portion located between the circular hole and the slit, and expanding the at least one fastening hole along a left-right direction, and
wherein the fixer holder comprises:
a holder body supported by the hooking portion of the at least one fastening hole, and having an open ring shape having an open side;
a first guide stopper and a second guide stopper extending from respective ends of the holder body toward the circular hole, and widening from the hooking portion toward the circular hole; and a first end tip and a second end tip extending from an end of the first guide stopper and an end of the second guide stopper, respectively, and supported by an outer wall of the circular hole.

2. The display device of claim 1, wherein the fixer holder further comprises a hook extending from the first guide stopper, the second guide stopper or the holder body, and hooked to the fastening portion of the at least one fastening hole.

3. The display device of claim 1, wherein the fixer comprises:

a shaft fixed to the frame; and a head at a distal end of the shaft, wherein a diameter of the head is larger than a diameter of the shaft, and corresponds to a diameter of the circular hole.

4. The display device of claim 3, wherein the diameter of the head corresponds to an inner diameter of the holder body.

5. The display device of claim 4, wherein a width of the slit corresponds to the diameter of the shaft of the fixer.

6. The display device of claim 5, wherein a gap between the first guide stopper and the second guide stopper widens based on the head of the fixer moving from the circular hole to the slit, and the gap is narrowed based on the head of the fixer being positioned in the slit.

7. The display device of claim 6, wherein a width of a neck formed by the first guide stopper, the second guide stopper and the holder body is smaller than the head of the fixer.

* * * * *